United States Patent
Charney et al.

(10) Patent No.: US 10,255,072 B2
(45) Date of Patent: Apr. 9, 2019

(54) ARCHITECTURAL REGISTER REPLACEMENT FOR INSTRUCTIONS THAT USE MULTIPLE ARCHITECTURAL REGISTERS

(71) Applicant: Intel Corporation, Santa Clara, CA (US)

(72) Inventors: Mark J. Charney, Lexington, MA (US); Robert Valentine, Kiryat Tivon (IL); Milind B. Girkar, Sunnyvale, CA (US); Ashish Jha, Portland, OR (US); Bret L. Toll, Hillsboro, OR (US); Elmoustapha Ould-Ahmed-Vall, Chandler, AZ (US); Jesus Corbal San Adrian, Barcelona (ES); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 15/201,310

(22) Filed: Jul. 1, 2016

(65) Prior Publication Data
US 2018/0004523 A1 Jan. 4, 2018

(51) Int. Cl.
*G06F 9/30* (2018.01)

(52) U.S. Cl.
CPC ...... *G06F 9/30123* (2013.01); *G06F 9/30145* (2013.01); *G06F 9/30163* (2013.01)

(58) Field of Classification Search
None
See application file for complete search history.

(56) References Cited

U.S. PATENT DOCUMENTS

| | | | |
|---|---|---|---|
| 5,835,774 A * | 11/1998 | Caldwell | G06F 8/443 717/152 |
| 6,189,094 B1 | 2/2001 | Hinds et al. | |
| 6,604,193 B1 | 8/2003 | Shimada et al. | |

(Continued)

OTHER PUBLICATIONS

Grochowski et al., "Interruptible and Restartable Matrix Multiplication Instructions, Processors, Methods, and Systems", U.S. Appl. No. 15/201,442, filed Jul. 2, 2016, 71 pages.

(Continued)

*Primary Examiner* — Eric Coleman
(74) *Attorney, Agent, or Firm* — NDWE, LLP

(57) ABSTRACT

A processor of an aspect includes a decode unit to decode an instruction. The instruction is to explicitly specify a first architectural register and is to implicitly indicate at least a second architectural register. The second architectural register is implicitly to be at a higher register number than the first architectural register. The processor also includes an architectural register replacement unit coupled with the decode unit. The architectural register replacement unit is to replace the first architectural register with a third architectural register, and is to replace the second architectural register with a fourth architectural register. The third architectural register is to be at a lower register number than the first architectural register. The fourth architectural register is to be at a lower register number than the second architectural register. Other processors are also disclosed, as are methods and systems.

23 Claims, 15 Drawing Sheets

(56) References Cited

U.S. PATENT DOCUMENTS

| | | | |
|---|---|---|---|
| 6,877,084 B1* | 4/2005 | Christie | G06F 9/30036 |
| | | | 711/125 |
| 2003/0188130 A1* | 10/2003 | Henry | G06F 9/30098 |
| | | | 712/209 |
| 2012/0060011 A1* | 3/2012 | Belanger | G06F 8/441 |
| | | | 711/170 |
| 2013/0290680 A1 | 10/2013 | Keller et al. | |
| 2014/0013085 A1* | 1/2014 | Vats | G06F 9/3012 |
| | | | 712/217 |
| 2014/0164739 A1 | 6/2014 | Gschwind et al. | |
| 2014/0164744 A1 | 6/2014 | Greiner et al. | |
| 2015/0006848 A1 | 1/2015 | Hinton et al. | |
| 2015/0121047 A1* | 4/2015 | Bradbury | G06F 9/30098 |
| | | | 712/226 |
| 2016/0140079 A1* | 5/2016 | Kravitz | G06F 9/30014 |
| | | | 712/22 |
| 2017/0177340 A1 | 6/2017 | Jha et al. | |
| 2017/0177543 A1 | 6/2017 | Jha et al. | |
| 2017/0192782 A1 | 7/2017 | Valentine et al. | |
| 2018/0004510 A1 | 1/2018 | Grochowski et al. | |

OTHER PUBLICATIONS

Jha et al., "Aggregate Scatter Instructions", U.S. Appl. No. 14/979,047, filed Dec. 22, 2015, 69 pages.

Jha et al., "Vector Store/Load Instructions for Array of Structures", U.S. Appl. No. 14/977,782, filed Dec. 22, 2015, 54 pages.

Valentine et al., "Systems, Apparatuses, and Methods for Aggregate Gather and Stride", U.S. Appl. No. 14/984,132, filed Dec. 30, 2015, 79 pages.

International Search Report and Written Opinion for Application No. PCT/US2017/035407, dated Sep. 6, 2017, 14 pages.

International Preliminary Report on Patentability for Application No. PCT/US2017/035407, dated Jan. 10, 2019, 11 pages.

* cited by examiner

FIG. 5

METHOD OF PERFORMING
INSTRUCTION WITH
REGISTER REPLACEMENT
544

RECEIVE INSTRUCTION EXPLICITLY SPECIFYING FIRST ARCHITECTURAL REGISTER AND IMPLICITLY INDICATING AT LEAST SECOND ARCHITECTURAL REGISTER, WHERE SECOND ARCHITECTURAL REGISTER IS IMPLICITLY AT HIGHER REGISTER POSITION THAN FIRST ARCHITECTURAL REGISTER — 545

REPLACE FIRST ARCHITECTURAL REGISTER WITH THIRD ARCHITECTURAL REGISTER AT LOWER REGISTER POSITION THAN FIRST ARCHITECTURAL REGISTER — 546

REPLACE SECOND ARCHITECTURAL REGISTER WITH FOURTH ARCHITECTURAL REGISTER AT LOWER REGISTER POSITION THAN SECOND ARCHITECTURAL REGISTER — 547

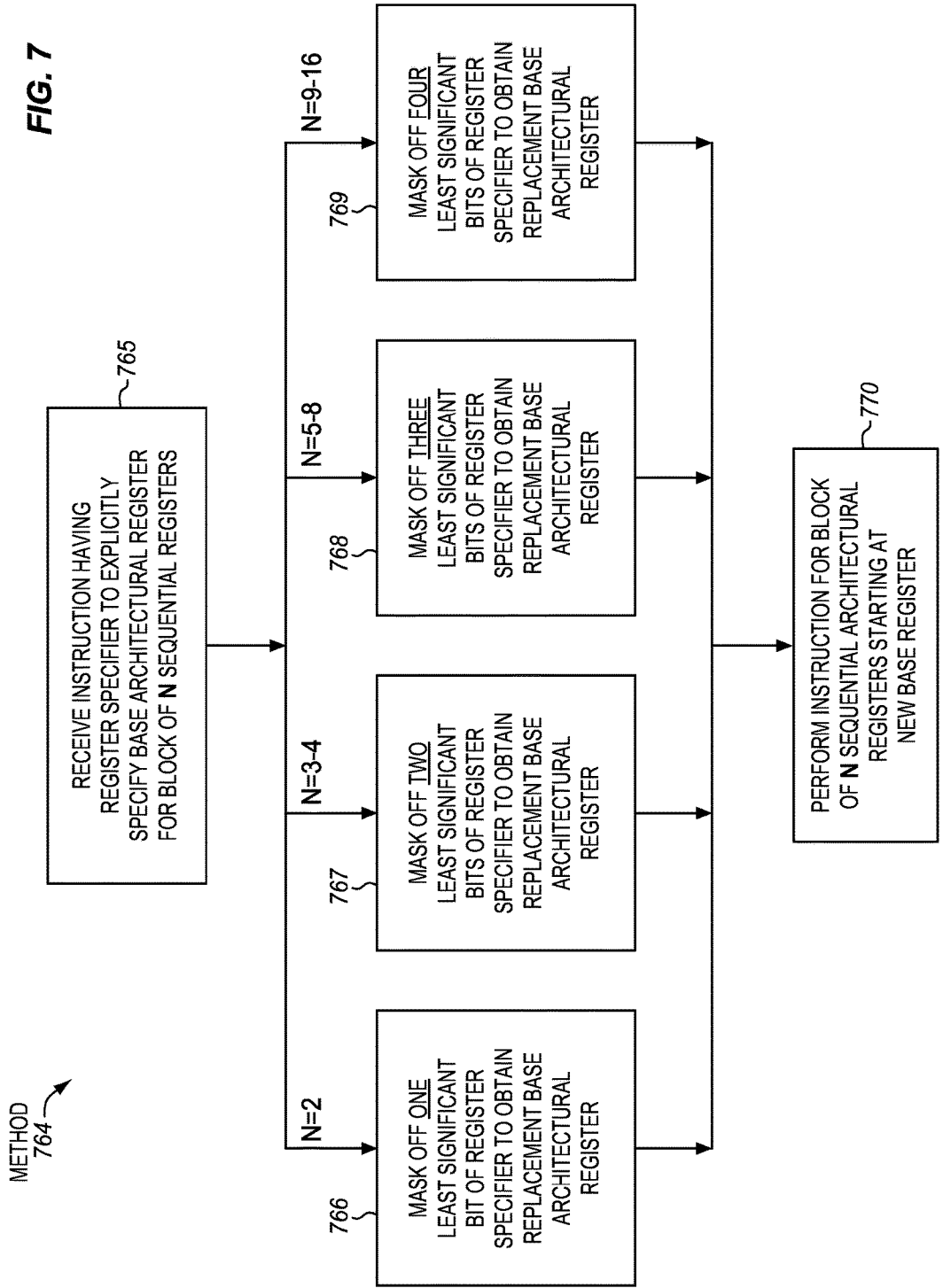

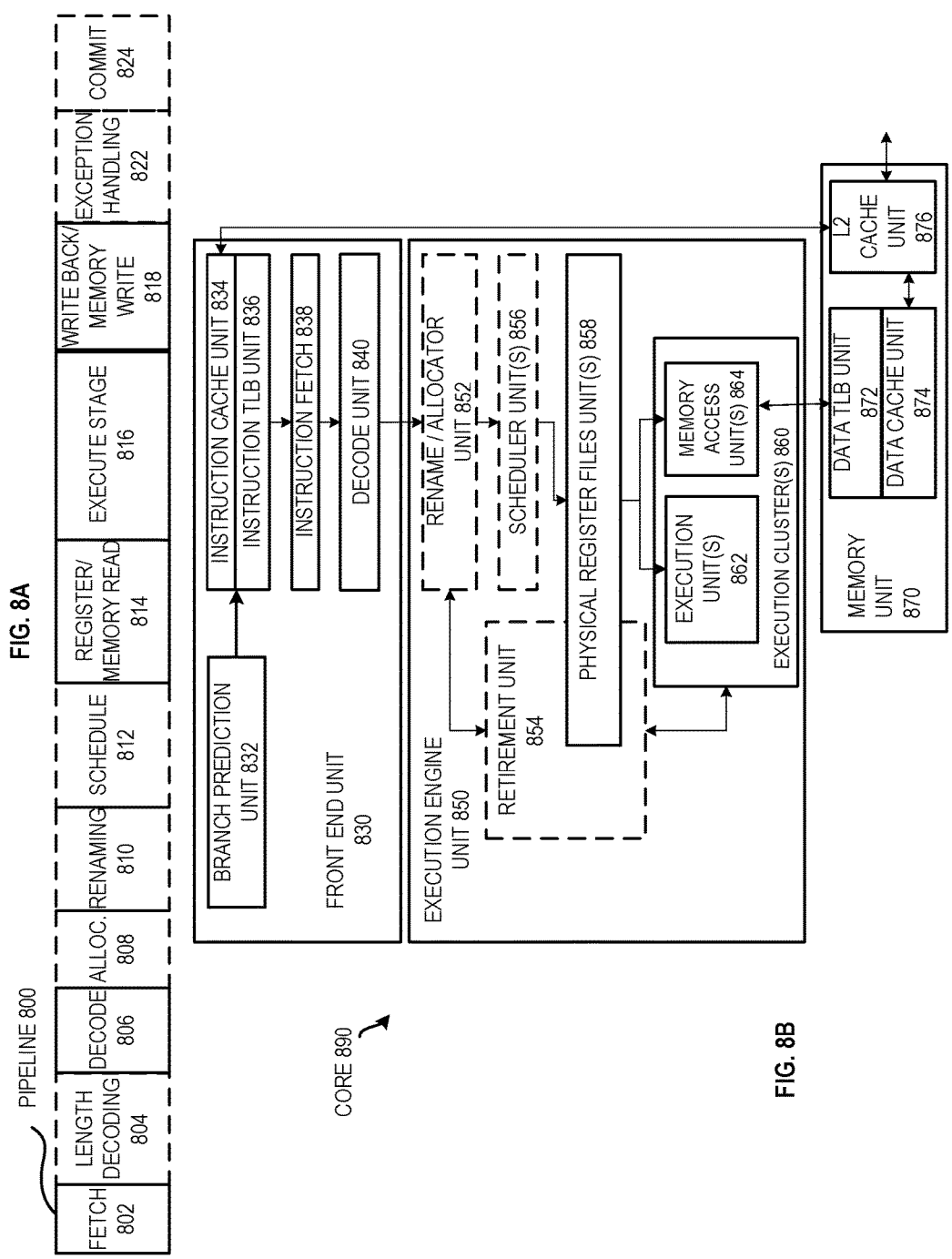

ARCHITECTURAL REGISTER REPLACEMENT FOR INSTRUCTIONS THAT USE MULTIPLE ARCHITECTURAL REGISTERS

BACKGROUND

Technical Field

Embodiments described herein generally relate to processors. In particular, embodiments described herein generally relate to processors to perform instructions that use multiple architectural registers.

Background Information

Processors generally have instruction sets that include the various different types of instructions that the processors are able to perform. These instructions commonly specify or otherwise indicate registers of the processor to identify operands. These registers which are indicated by the instructions are generally referred to as architectural registers.

BRIEF DESCRIPTION OF THE DRAWINGS

The invention may best be understood by referring to the following description and accompanying drawings that are used to illustrate embodiments. In the drawings:

FIG. 5 is a block flow diagram of an embodiment of a method of performing an instruction including performing register replacement.

FIG. 7 is a block flow diagram of an example embodiment of a method of performing register replacement for an instruction according to one possible approach.

FIG. 8A is a block diagram illustrating an embodiment of an in-order pipeline and an embodiment of a register renaming out-of-order issue/execution pipeline.

FIG. 8B is a block diagram of an embodiment of processor core including a front end unit coupled to an execution engine unit and both coupled to a memory unit.

DETAILED DESCRIPTION OF EMBODIMENTS

Disclosed herein are embodiments of methods of replacing registers, embodiments of register replacement units, embodiments of processors having such register replacement units, embodiments of systems incorporating one or more processors to perform register replacement. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
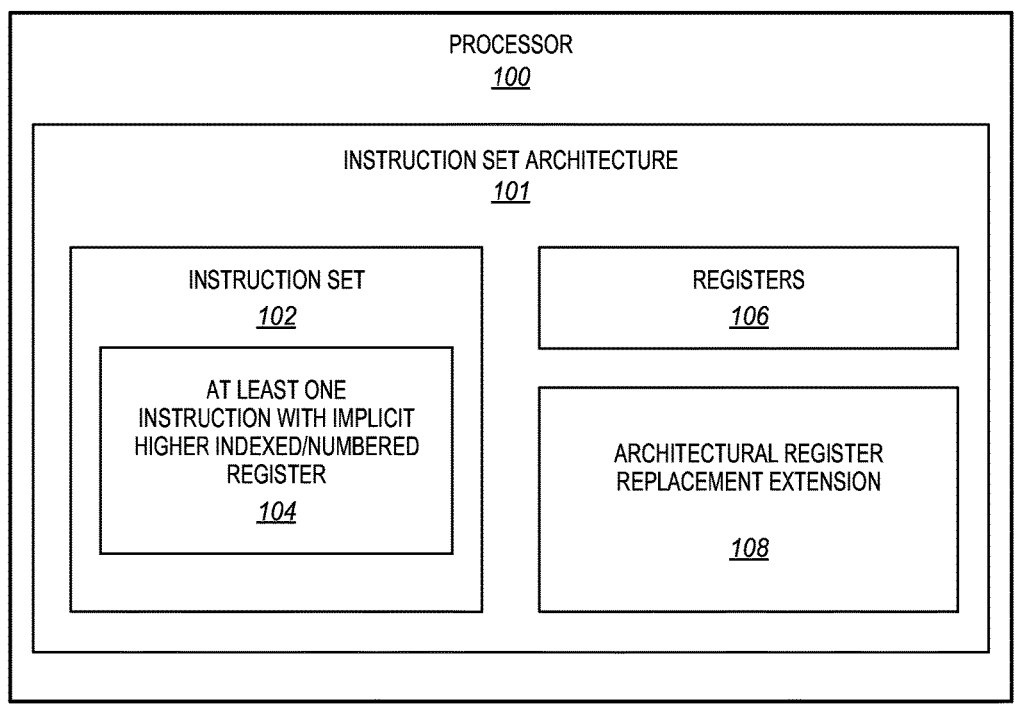
FIG. 1 is a block diagram of an embodiment of a processor.

FIG. 1 is a block diagram of an embodiment of a processor 100. The processor has an instruction set architecture (ISA) 101. The ISA represents a part of the architecture of the processor related to programming, and commonly includes the native instructions, architectural registers, data types, addressing modes, memory architecture, and the like, of the processor. The ISA is distinguished from the microarchitecture, which generally represents the particular processor design techniques selected to implement the ISA.

The ISA includes architectural registers 106. Each of the registers may represent an on-die or on-integrated circuit storage location that is operative to store data. The architectural registers may represent architecturally-visible registers that are visible to software and/or a programmer and/or that are the registers indicated by instructions of the instruction set 102 of the processor to identify operands. These architectural registers are contrasted to other non-architectural registers in a given microarchitecture (e.g., temporary registers, reorder buffers, retirement registers, etc.). The architectural registers may also be referred to herein simply as registers. These registers may be implemented in different ways in different microarchitectures and are not limited to any particular type of design. Examples of suitable types of registers include, but are not limited to, dedicated physical registers, dynamically allocated physical registers using register renaming, and combinations thereof.

The illustrated ISA also includes the instruction set 102. The instructions of the instruction set may represent macroinstructions, machine language instructions, or the like, which the processor is natively able to perform (e.g., decode and execute), as opposed to microinstructions or micro-ops (e.g., those which result from a decoder decoding the instructions of the instruction set). Each of the instructions may have an instruction format that includes an operation code or opcode that is used to identify the operation to be performed, commonly one or only a few register specifiers (e.g., fields or other sets of bits) to specify register operands (e.g., individual registers in the architectural registers 106), and depending upon the instruction zero or more of various other types of fields, such as, for example, an immediate, prefix, operation qualifier, etc.

Commonly, in order to avoid an excessive instruction length (e.g., which can complicate decoding) and/or due to constraints imposed by the ISA, the number of register specifiers in an instruction is generally is no more than a few (e.g., often no more than about two, three, or four). However, for some instructions and/or some operations, it may be desirable to be able to use additional registers. For example, this may allow more data to be read from memory or stored to memory within the confines of performing a single instruction. As another example, this may allow more data to be arithmetically, logically, or otherwise processed within the confines of performing a single instruction. One approach that may be used to provide one or more additional registers, without introducing an additional register specifier into the instruction format, is to make the registers implicit, implied, or inherent to the instruction (e.g., the opcode), rather than needing to make them explicitly expressed through a register specifier. As shown, in some embodiments, the instruction set may include at least one instruction with an implicit higher indexed or numbered register 104. To further illustrate certain concepts, one illustrative example of a suitable instruction with an implicit higher indexed or numbered register will be described in further detail.

Figure 2:
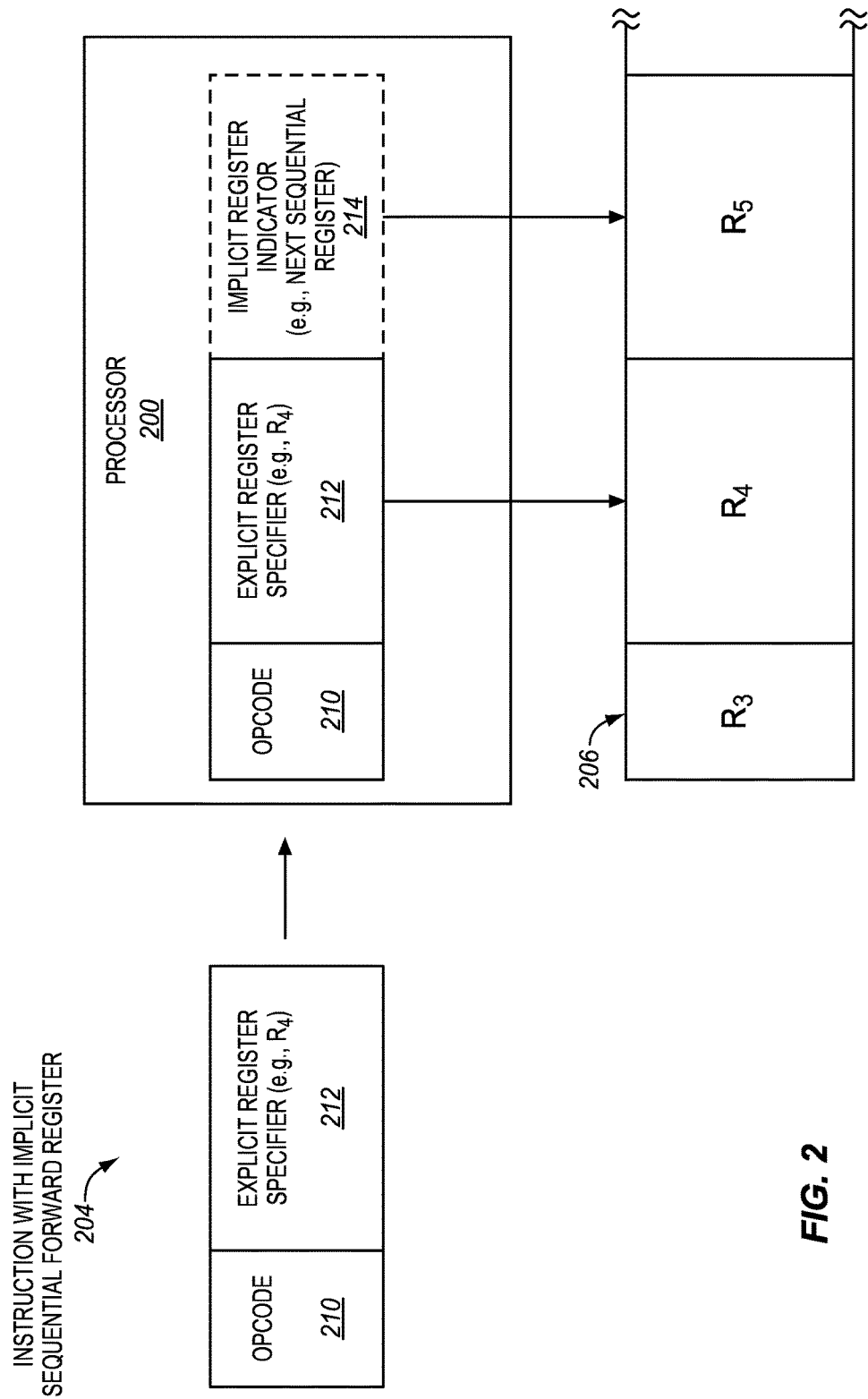
FIG. 2 is a block diagram illustrating use of one example of a suitable instruction with an implicit higher indexed or numbered register.

FIG. 2 is a block diagram illustrating use of one example of a suitable instruction 204 with an implicit higher indexed or numbered register. The instruction has an opcode 210 (e.g., a field or other set of bits) to identify the instruction and/or the operation to be performed (e.g., a particular arithmetic, logical, or other operation), and an explicit register specifier 212 (e.g., a field or other set of bits) to explicitly specify a register (e.g., which in this example is a given register R4) in a set of architectural registers 206. The opcode and the explicit register specifier are commonly contiguous bits, but may also be non-contiguous bits that logically represent the opcode or specifier. The instruction may be provided to a processor 200. The processor may implicitly, impliedly, or inherently understand (e.g., from the opcode 210) that in addition to the specified register (e.g., R4), the instruction is to use (in this example) one additional higher indexed or otherwise numbered register that follows the specified register (e.g., in the direction of increasing register index, increasing register name, or otherwise in increasing register number). In this example, the implicit higher numbered register is an implicit next sequentially higher numbered register (e.g., R5) which sequentially immediately follows the specified register (e.g., R4), although other relationships may also optionally be used (e.g., skip one register, etc.), if desired. Dashed lines are used to show that it may be implicit to the instruction (e.g., implicit to its opcode), and the processor may understand (e.g., from the opcode), that the instruction also has an implicit register identifier 214 to indicate the higher numbered register (e.g., R5), even though the actual instruction may not have any bits (e.g., non-opcode bits) to specify this additional higher numbered register (e.g., R5). The use of one or more such implicit registers may allow additional registers to be used, even though the instruction format and/or the ISA don't allow the explicit specification of such additional registers. In this example, only one additional register is being used, although such an approach may also be used to indicate 2, 3, 4, 5, 6, 7, 8, or more registers.

Referring again to FIG. 1, one specific suitable example of the instruction 104 with the implicit higher indexed or otherwise numbered register is a read multiple registers from memory instruction. The read multiple registers from memory instruction may explicitly specify (e.g., through a field or other set of bits) a single destination vector register.

In addition, it may be implicit to the instruction (e.g., implicit to its opcode) that one or more additional following destination vector registers (e.g., which sequentially follow the single specified register) are also to be used, although the instruction may not have any non-opcode bits to explicitly specify these registers. The read multiple registers from memory instruction, when performed, may cause data to be read from memory stored in the single specified destination vector register as well as each of the one or more implicitly indicated following destination vector registers (e.g., which may sequentially follow the single specified register). Another specific suitable example is an analogous store multiple registers to memory instruction, which may perform a store of data from a specified source register, and one or more implicit following source registers, to memory. Other specific suitable examples are analogous instructions that read from or store to memory in an analogous way but for general-purpose registers instead of vector registers. Yet another specific suitable example is an instruction to gather or otherwise read data elements from potentially non-contiguous locations in memory into an explicitly specified vector register and at least one implicit following vector register. A further specific suitable example is an instruction to scatter or otherwise store data elements from an explicitly specified vector register and at least one implicit following vector register to potentially non-contiguous locations in memory. Yet another specific suitable example is an arithmetic instruction that uses an explicitly specified general-purpose or vector register and at least one implicit following register of the same type. These are just a few illustrative examples. It is to be appreciated that the embodiments disclosed herein may be used for a wide variety of different types of instructions with at least one implicit higher indexed or numbered register.

Referring again to FIG. 1, the ISA also includes an architectural register replacement extension 108. As will be explained further below, in some embodiments, at least under certain conditions, the architectural register replacement extension may be operative to replace at least two architectural registers (e.g., including at least one implicit higher indexed or numbered register) with different architectural registers. In some embodiments, the register replacement may be in a backwards direction (e.g., in the direction of decreasing register index, decreasing register number, etc.). In some embodiments, the register replacement may be performed in a way to prevent wrap-around in register name space.

One challenge when processing an instruction with an implicit higher indexed or numbered register is a possibility of wrap-around in the register name space. This challenge may be further compounded when such instructions are performed in ISAs that define or support different numbers of architectural registers for different operation modes. In such cases, whether or not there is wrap-around in the register name space may be dependent upon the current operating mode.

Figure 3A:
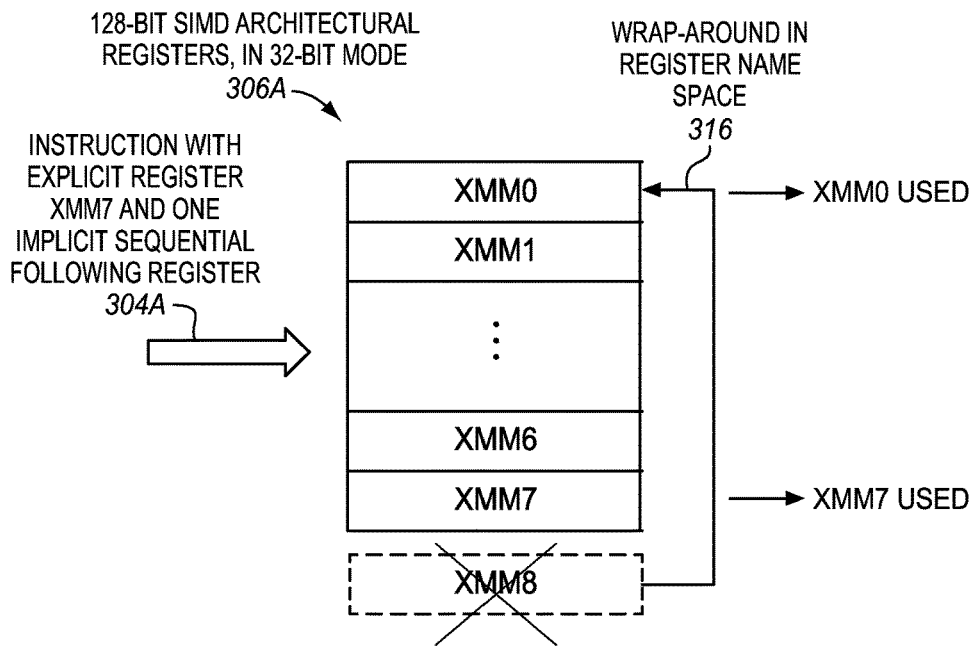
FIGS. 3A-3B are block diagrams of example embodiments of suitable architectural registers that illustrate register wrap-around.
Figure 3B:
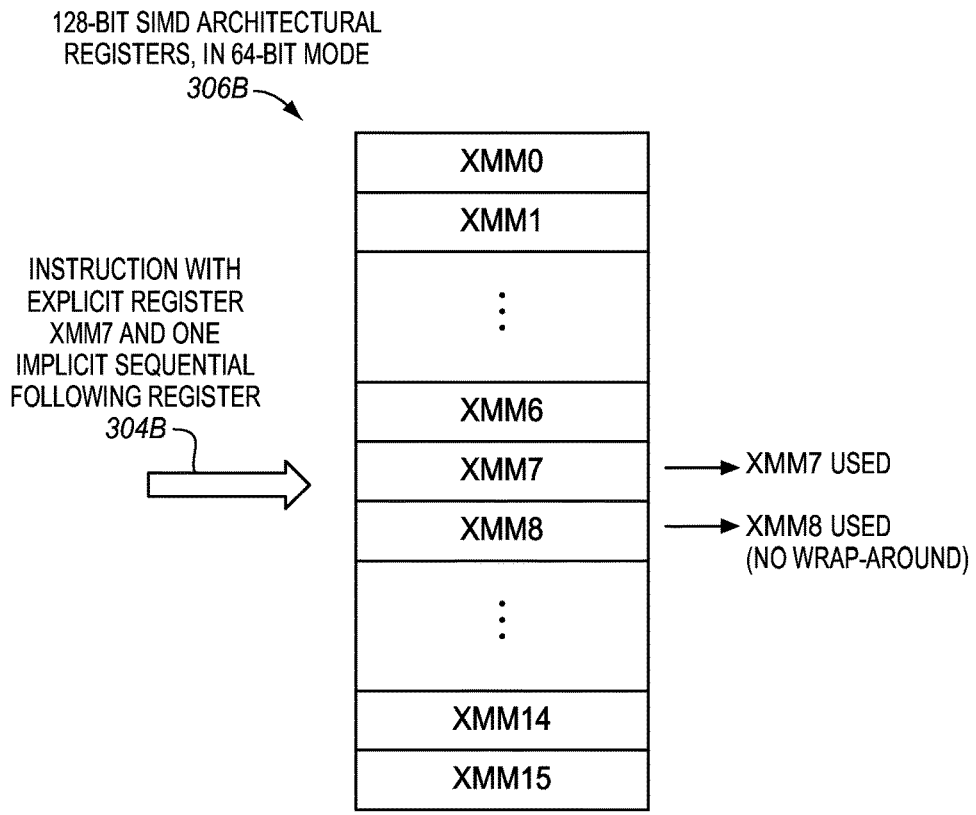

FIGS. 3A-3B are block diagrams of suitable example embodiments of architectural registers, and illustrate wrap-around in register name space. FIG. 3A illustrates a set of eight 128-bit single-instruction, multiple data (SIMD) architectural registers 306A, named XMM0 through XMM7, which are available when operating in a 32-bit operation mode, for most IA-32 Architecture processors. Consider that an instruction 304A with an explicitly specified register XMM7 and one implicit next sequential following register is performed when in 32-bit mode operation. Since the instruction specifies the register XMM7, the next sequential XMM register would be the register XMM8. However, XMM8 does not exist in the 32-bit mode. Accordingly, a roll-over or other wrap-around 316 in the register name or register index space may occur, such that the register XMM0 may instead be used as the implicit register. The registers XMM7 and XMM0 may be used in this case.

FIG. 3B illustrates a set of sixteen 128-bit SIMD architectural registers 306B, named XMM0 through XMM15, which are available when operating in a 64-bit operation mode, for most Intel® 64 Architecture processors. Thirty-two XMM registers (XMM0 through XMM31) may also be available in the 64-bit mode, but for simplicity of illustration are not shown. Notice that registers XMM8 through XMM15 are available in the 64-bit mode, but not in the 32-bit mode. In other words, the number of registers varies from one mode to another. Consider that another instance of the same instruction 304B is performed in 64-bit mode operation. Since the instruction specifies the register XMM7, the next sequential XMM register would again be the register XMM8. However, the register XMM8 does exist in the 64-bit mode. Accordingly, there would be no wrap-around or roll-over in the register name or index space when the instruction is performed in the 64-bit mode. Rather, the registers XMM7 and XMM8 would be used.

Accordingly, wrap-around or roll-over in the register name or index space may occur in one mode, but not in another mode. Such mode-dependent wrap-around may result in different registers being, and different results being generated, when the instructions are performed in the different operating modes. This is generally undesirable. This could also happen for other types of architectural registers and/or in other architectures besides just Intel Architectures, especially when there are different numbers of registers in different modes. Commonly, it is expected that the programmers may select the specified register wisely in a way that would avoid such wrap-around. However, there is a chance for programming errors, which could lead to incorrect or inconsistent results being generated.

Often it may be useful and beneficial for the processor to be operative to handle such occurrences, even if they are expected to be relatively rare. One possible approach would be for the processor to include checking logic (e.g., context dependent fault and/or undefined instruction checking logic) to allow the processor to check the registers that would be used for the instruction to see if such wrap-around would occur and/or for associated potential interaction with other operands in the case of such wrap-around. However, such checking logic may tend to have certain drawbacks, such as, for example, one or more of being generally complex to design and implement, increasing power consumption, increasing die area, needing additional validation, or the like. Other approaches would therefore be useful and beneficial.

Embodiments described herein may allow a processor to perform register replacement to replace two or more architectural registers for an instruction. As one specific illustrative example, if the instruction 304A with the explicitly specified register XMM7 and the implicit next sequential following register XMM8, is performed in 32-bit mode operation, in some embodiments, the processor may replace XMM7 with XMM6 (e.g., by converting a register index for the XMM7 register into a register index for the XMM6 register), and may replace XMM8 with XMM7. Advantageously, this prevents wrap-around, and it's previously described drawbacks. Also, this may provide an alternative so that optionally there may be no need to include the aforementioned checking logic to check for wrap-around, although such checking logic may optionally also be used, if desired. Likewise, in some embodiments, if the same instruction is performed in a 64-bit mode, the processor may also replace XMM7 with XMM6 (e.g., by converting a register index for the XMM7 register into a register index for the XMM6 register), and may replace XMM8 with XMM7. This may help to prevent different registers being used in different modes and/or different results from being generated in different modes. This is just one illustrative example. Alternate embodiments are contemplated in which other registers are used.

Figure 4:
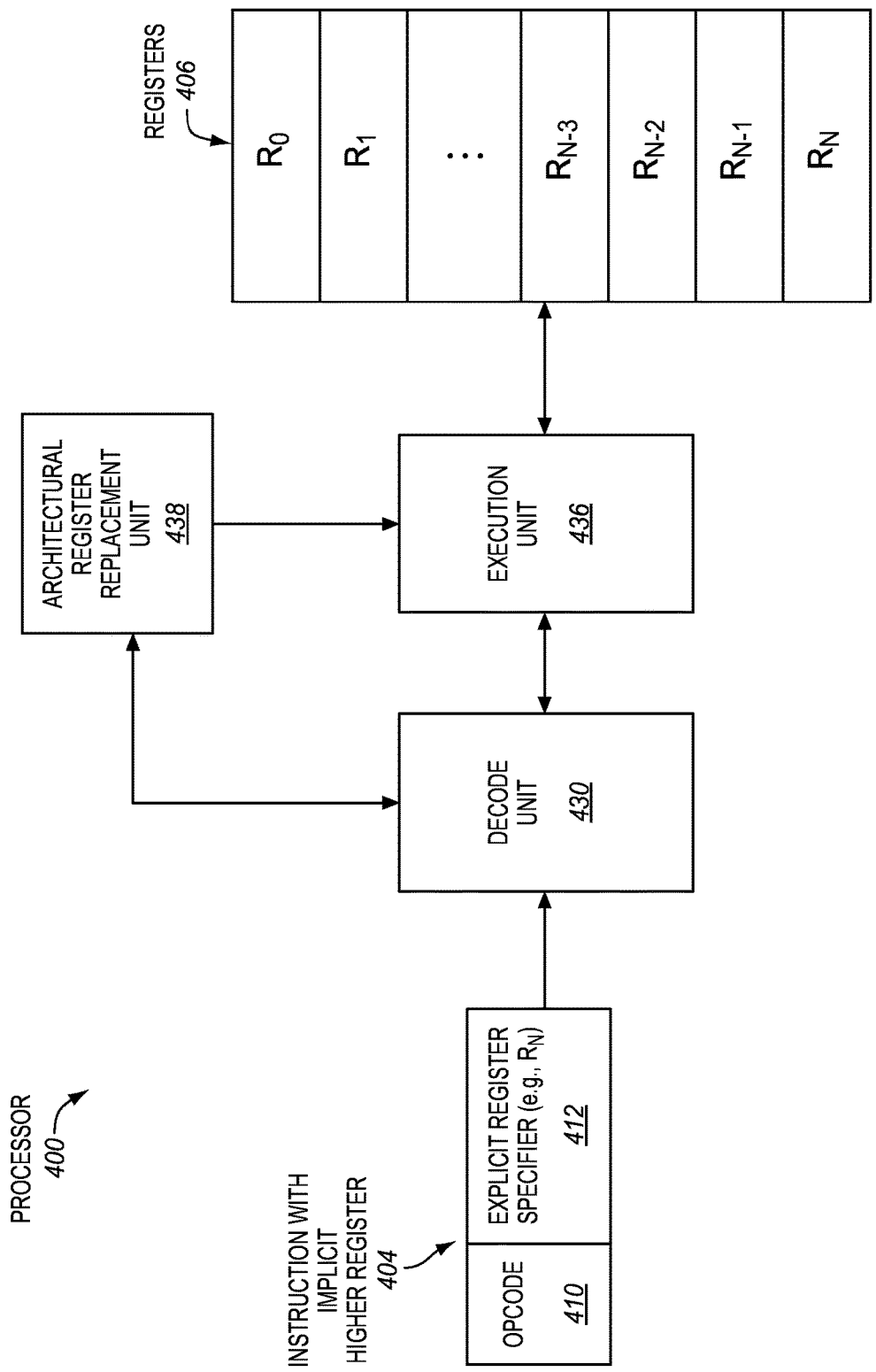
FIG. 4 is a block diagram of an embodiment of a processor in which embodiments of the invention may be implemented.

FIG. 4 is a block diagram of an embodiment of a processor 400 in which embodiments of the invention may be implemented. The processor has an embodiment of an architectural register replacement unit 438.

In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures). In some embodiments, the processor may include be disposed on at least one integrated circuit or semiconductor die. In some embodiments, the processor may include at least some hardware (e.g., transistors, capacitors, diodes, circuitry, non-volatile memory storing microcode, or the like).

The processor includes the set of registers 406. In the illustrated example, these include registers R0 through RN, where any reasonable number of registers desired for the particular implementation may optionally be implemented. Commonly, there may be from around 8 to around 64 registers, although the scope of the invention is not so limited. These registers may represent architectural registers. Each of the registers may represent an on-die or on-integrated circuit storage location that is operative to store data. These registers may be implemented in different ways in different microarchitectures and are not limited to any particular type of design. Examples of suitable types of registers include, but are not limited to, dedicated physical registers, dynamically allocated physical registers using register renaming, and combinations thereof. Specific examples of suitable sets of registers include, but are not limited to, the registers 306A and/or 306B of FIGS. 3A-B, although the scope of the invention is not so limited.

During operation, the processor 400 may receive an instruction 404. The instruction may represent a macroinstruction, machine language instruction, or other instruction or control signal of an instruction set of the processor. The instruction has an opcode 410 (e.g., a field or other set of contiguous or non-contiguous bits) to identify the instruction and/or the operation to be performed (e.g., a particular arithmetic, logical, or other operation). The instruction also has at least one explicit register specifier 412 (e.g., a field or other set of contiguous or non-contiguous bits) to explicitly specify at least a first architectural register in a set of architectural registers 406. The explicitly specified register may variously be used for a source operand, a destination operand, or initially for a source operand and later for a destination operand.

In some embodiments, the instruction may also have at least one implicit second architectural register in the set of architectural registers 406. In some embodiments, the second architectural register may implicitly be at a higher register index or number than the first architectural register. The at least one implicit higher indexed register may either be used for a source operand or a destination operand of the instruction. In various embodiments, there may optionally be 1, 2, 3, 4, 5, 6, 7, 8, or more such implicit higher indexed registers. The processor may inherently or otherwise implicitly understand (e.g., from the opcode 410) that the instruction is to use the at least one implicit higher indexed register, even though the instruction may not have any non-opcode bits to explicitly specify the at least one implicit higher indexed or numbered register. In some embodiments, the implicit higher register may optionally be an implicit higher next sequential register index or number that immediately sequentially follows the specified register, although the scope of the invention is not so limited.

Referring again to FIG. 4, the processor includes a decode unit or decoder 430. The decode unit may receive and decode the instruction 404. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level instruction 404. In some embodiments, the decode unit may include one or more input structures (e.g., port(s), interconnect(s), an interface) to receive the instruction 404, an instruction recognition and decode logic coupled therewith to recognize and decode the instruction 404, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units. In some embodiments, the decode unit may be included on a die (e.g., on die with the execution unit 436). In some embodiments, the decode unit may include at least some hardware (e.g., transistors, integrated circuitry, or on-die firmware, etc.).

In some embodiments, the decoding may allow the decoder and/or the processor to determine the particular instruction and/or operation that is to be performed (e.g., based on the opcode). For example, the opcode may indicate whether implicit higher indexed or numbered registers are to be used, which bits of the instruction encoding provide the specified register index, etc. The decoding may also allow the decoder and/or the processor to determine whether the instruction has any implicit registers, and if so how many, and their relation to their associated specified registers (e.g., if they are the next sequential following register or something else). Such factors, in some embodiments, may be fixed or implicit to the instruction (e.g., the opcode). In some embodiments, in the case of the instruction 404 which has the at least one implicit higher indexed or numbered register, the decoder may be operative to output or otherwise provide one or more relatively lower-level instructions or control signals (e.g., one or more microinstructions, micro-operations, micro-code entry points, decoded instructions or control signals, etc.), which reflect, represent, and/or are derived from the relatively higher-level instruction 404, to the architectural register replacement unit 438.

The architectural register replacement unit 438 may be coupled with the decode unit 430. In some embodiments, the architectural register replacement unit may be operative (e.g., responsive to the instruction, responsive to control from the decode unit based on the instruction, etc.) to replace the explicitly specified first architectural register with a third architectural register, and to replace the implicitly indicated second architectural register with a fourth architectural register. In some embodiments, the third architectural register may be at a lower register index or number than the first architectural register. In some embodiments, the fourth architectural register may be at a lower register index or number than the second architectural register. As one illustrative example, the explicitly specified first register may be register RN, the implicit higher second register would be register RN+1 (which is not supported for the illustrated set of registers and so there would be register wrap-around), the replacement third register may be register RN−1, and the replacement fourth register may be register RN. By way of example, in some embodiments, such register replacement may be achieved by converting a register index or identifier for the first architectural register to the register index or identifier for the third architectural register (e.g., by masking off one or more lowest order bits of the register index or identifier for the first architectural register), as will be described further below.

In some embodiments, the original/initial registers indicated by the instruction may be a block of sequential registers, and the replacement registers may be a block of sequential registers that have been moved or relocated as a group to a relatively lower register index or number. In some embodiments, the amount of offset or displacement (e.g., in numbers of registers) of a replacement base architectural register of the replacement block, from the original/initial base architectural register of the original/initial block, may be based on and/or dependent on a number of sequential architectural registers to be used when performing the instruction. In some embodiments, the replacement registers may maintain a same relative ordering or relation to one another as their corresponding initial/original registers (e.g., those indicated by the instruction) had to one another.

In some embodiments, this may be done in a way that the replacement register block fits within a supported number of architectural registers without register wrap-around from the highest architectural register to the lowest architectural register, whereas without the register replacement such register wrap-around may have occurred in at least one mode of operation. In addition, this may optionally help to avoid needing to necessarily have checking logic of the types described above, and the associated potential drawbacks, although such checking logic may optionally be included, if desired.

The register replacement unit 438 may be implemented in hardware (e.g., integrated circuitry, transistors or other circuit elements, etc.), firmware (e.g., ROM, EPROM, flash memory, or other persistent or non-volatile memory and microcode, microinstructions, or other lower-level instructions stored therein), software (e.g., higher-level instructions stored in memory), or a combination thereof (e.g., hardware potentially combined with one or more of firmware and/or software).

The execution unit 436 is coupled with the decode unit 430 and the registers 406. In some embodiments, the execution unit may be on a die or integrated circuit (e.g., on die or integrated circuit with the decode unit). The execution unit may receive the one or more decoded or otherwise converted instructions or control signals that represent and/or are derived from the instruction 404. The execution unit is operative in response to and/or as a result of the instruction 404 (e.g., in response to one or more instructions or control signals decoded from the instruction and/or in response to the instruction being decoded and/or in response to the instruction being provided to a decoder) to perform the operation associated with the instruction. The various different types of instructions and operations described above, as well as other types, are suitable. In some embodiments, rather than using the architectural registers initially or originally specified or otherwise indicated by the instruction 404, the execution unit may instead use the replacement architectural registers determined as described above (or renamed logical registers used to implement these replacement architectural registers).

The execution unit and/or the processor may include specific or particular logic (e.g., transistors, integrated circuitry, or other hardware potentially combined with firmware (e.g., instructions stored in non-volatile memory) and/or software) that is operative to perform the instruction 404. By way of example, depending upon the particular instruction, suitable execution units include, but are not limited to, an arithmetic unit, an arithmetic logic unit, a digital circuit to perform arithmetic and logical operations, a fused multiply-add unit, a memory execution unit, a load unit, a store unit, a memory access unit, or the like. In some embodiments (e.g., in the case of an arithmetic instruction), the execution unit may include one or more input structures (e.g., port(s), interconnect(s), an interface) to receive one or more source operands, circuitry or logic coupled therewith to receive and process the one or more source operands and generate one or more result operands, and one or more output structures (e.g., port(s), interconnect(s), an interface) coupled therewith to output the one or more result operands.

To avoid obscuring the description, a relatively simple processor 400 has been shown and described. However, the processor may optionally include other processor components. For example, various different embodiments may include various different combinations and configurations of the components shown and described for any of FIGS. 8-10. All of the components of the processor may be coupled together to allow them to operate as intended.

FIG. 5 is a block flow diagram of an embodiment of a method 544 of performing an instruction and performing register replacement. In various embodiments, the method may be performed by a processor, instruction processing apparatus, digital logic device, or integrated circuit. In some embodiments, the method 544 may be performed by and/or with the processor 400 of FIG. 4 and/or using the instruction 404 of FIG. 4. The components, features, and specific optional details described herein for the processor 400 and/or the instruction 404, also optionally apply to the method 544. Alternatively, the method 544 may be performed by and/or within a similar or different processor or apparatus and/or using a similar or different instruction. Moreover, the processor 400 may perform methods the same as, similar to, or different than the method 544.

The method includes receiving the instruction, at block 545. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The instruction may explicitly specify a first architectural register and implicitly indicate at least a second architectural register. The second architectural register may implicitly be at a higher register index or number than the first architectural register.

At block 546, the first architectural register may be replaced with a third architectural register at a lower register index or number than the first architectural register. At block 546, the second architectural register may be replaced with a fourth architectural register at a lower register index or number than the second architectural register.

In some embodiments, the selection of the replacement registers and/or the amount of offset or displacement (e.g., in register number, register index, register identifier value, etc.) of the replacement base replacement register (e.g., in a lowest index or number in the block) from the initial/original explicitly specified base register of a sequential block of registers, may be based at least in part on the number of registers in a block of sequential registers indicated by the instruction. In some embodiments, the selection of the replacement registers and/or the amount of offset or displacement of the replacement base replacement register from the initial/original explicitly specified base register of a sequential block of registers, may be enough or sufficient to keep the maximum or highest register in the block of registers from exceeding a maximum or highest number register supported in an operation mode in order to prevent wrap-around to a minimum or lowest register.

To further illustrate certain concepts, a detailed example embodiment of one suitable approach for determining the replacement registers will be described, although the scope of the invention is not limited to just this approach. In some embodiments, the replacement registers may be derived or determined from the specified register index or other identifier (e.g., a set of bits indexing or otherwise identifying a register and/or providing a register number) by masking off (e.g., setting to zero) zero or more least significant (e.g., lowest ordered) bits of the specified register index based on or according to the number of registers in the indicated sequential block of registers used by the instruction. The specified register index or identifier may be converted or modified to a new index or identifier in order to achieve the replacement. In some embodiments, the number of least significant bits to mask off may be consistent with the following Equation 1.

$$\text{mask} = (1 << \text{ceiling}(\log 2(\text{number\_of\_registers}))) - 1 \quad \text{Equation 1}$$

In this equation, "number_of_registers" refers to the number of registers in the indicated sequential block of registers used by the instruction, "log 2" refers to the base 2 logarithm, and "ceiling" refers to an operation to round its operand up to the next higher integer value. It is to be appreciated that this is just one illustrative example of a suitable equation, and that the scope of the invention is not limited to just this equation. For example, other equations may optionally be derived for a block of registers that include every alternate register. As another example, a simpler approach or heuristic may optionally be used, such as, for example, always starting with a lowest number of registers in cases where there would be wrap-around. Other approaches will be apparent to those skilled in the art and having the benefit of the present disclosure.

Table 1 lists several illustrative evaluations of the intermediate quantity "ceiling(log 2(n))" and the "mask" for several illustrative values of "number_of_registers" (n)

ranging from 1 to 8. In this table, "0b" refers to a binary number, and the least significant bits of the mask are on the right hand side.

TABLE 1

Example mask values for different number of sequential registers

| number_of_registers (n) | ceiling(log2(n)) | mask |
|---|---|---|
| 1 | 0 | 0 = 0b00000 |
| 2 | 1 | 1 = 0b00001 |
| 3 | 2 | 3 = 0b00011 |
| 4 | 2 | 3 = 0b00011 |
| 5 | 3 | 7 = 0b00111 |
| 6 | 3 | 7 = 0b00111 |
| 7 | 3 | 7 = 0b00111 |
| 8 | 3 | 7 = 0b00111 |

The value of "ceiling(log 2(n))", in some embodiments, may represent the number of least significant (e.g., lowest ordered) bits, of the specified register index or identifier (e.g., a set of bits indexing or identifying a register), for the base of the block of sequential registers, to mask off (e.g., set to zero, treat as if zero, etc.). As shown, if the instruction indicates only one register then no bits may be masked off (e.g., in this case a replacement register is not determined), if the instruction indicates two sequential registers then one bit may be masked off, if the instruction indicates three or four sequential registers then two bits may be masked off, if the instruction indicates five, six, seven, or eight sequential registers then three bits may be masked off, and so on.

Notice that the number of set bits with a value of binary one in the mask equals the value of "ceiling(log 2(n))" for each row of the table. The masks may represent binary values that, at least conceptually, may be logically combined with the binary value of the specified register index for the base of the block of sequential registers to determine the replacement register index for the replacement base of the block of sequential registers. For example, at least conceptually, the following Equation 2 may be used:

$$\text{replacement\_reg\_id\_base} = \text{specified\_reg\_id\_base} \text{ AND (NOT mask)} \quad \text{Equation 2}$$

In this equation, "mask" refers to the mask determined by Equation 1, "AND" refers to a logical AND operation, "specified_reg_id_base" refers to the register index or other identifier of the base of the block of registers specified by the instruction, and "replacement_reg_id_base" refers to the replacement register index or other identifier of the base of the block of registers to be used when performing the instruction.

Figure 6:
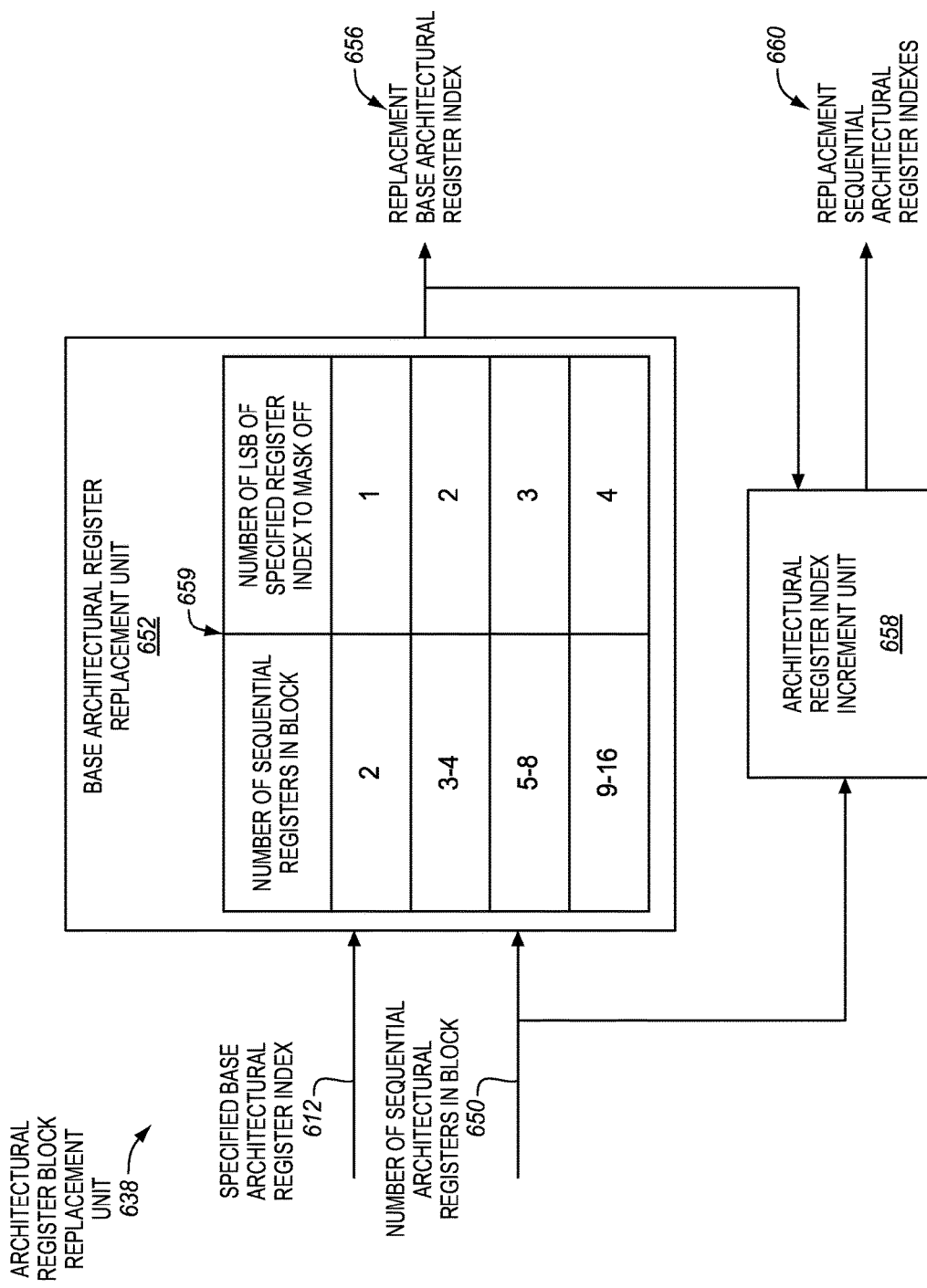
FIG. 6 is a block diagram of an example embodiment of a register block replacement unit.

FIG. 6 is a block diagram of an example embodiment of an architectural register block replacement unit 638. During operation, when an instruction which uses a block of sequential registers is detected, the register block replacement unit may receive a specified base architectural register index 612 for the block of sequential architectural registers, and a number of sequential architectural registers in the block of sequential architectural registers. The register block replacement unit includes a base architectural register replacement unit 652. In some embodiments, instead of generating the aforementioned masks anew for each instruction, and logically combining the mask with the specified register identifier for each instruction, the base register replacement unit may implement logic 654 that correlates the number of sequential architectural registers 650 in the block with the number of least significant bits (LSB) of the specified base register index 612 to mask off (e.g., treat as zero). The logic shown in table form in the illustration may commonly be in the form of a state machine or the like. The logic may be implemented in hardware, firmware, software, or a combination thereof (e.g., at least some hardware and/or firmware potentially/optionally combined with some software). According to the logic, if the number of sequential architectural registers 650 is two, then one least significant bit of the specified base register index may be masked off. If the number of sequential architectural registers is three or four, then two least significant bits of the specified base register index may be masked off. If the number of sequential architectural registers is five to eight, then three least significant bits of the specified base register index may be masked off. If the number of sequential architectural registers is nine to sixteen, then four least significant bits of the specified base register index may be masked off. By way of example, the base architectural register replacement unit may implement this by simply looking at those wires or other interconnects used to deliver the specified base register index which are not masked off, and assume the other wires or interconnects corresponding to the masked off least significant bits are cleared to zero or set to binary low values. The base architectural register replacement unit may output the determined replacement base architectural register index 656.

The architectural register block replacement unit also includes an architectural register index increment unit 658. The register index increment unit may receive the determined replacement base register index 656 and the number of sequential registers 650. For each of the sequential registers in the block that follow after the base register, the register index increment unit may increment the replacement base register index by one to determine the next sequential architectural register as the replacement register. For example, the next register from "replacement_reg_id_base" in the block may represent "replacement_reg_id_base"+1, and so on. This may effectively displace or move the entire sequential block of registers as a group. The unit 658 may output one or more replacement sequential architectural register indices 660.

FIG. 7 is a block flow diagram of an example embodiment of a method 764 of performing register replacement for an instruction. In various embodiments, the method may be performed by a processor, instruction processing apparatus, digital logic device, or integrated circuit. In some embodiments, the method 764 may be performed by and/or with the processor 400 of FIG. 4 and/or using the instruction 404 of FIG. 4. The components, features, and specific optional details described herein for the processor 400 and/or the instruction 404, also optionally apply to the method 764. Alternatively, the method 764 may be performed by and/or within a similar or different processor or apparatus and/or using a similar or different instruction. Moreover, the processor 400 may perform methods the same as, similar to, or different than the method 764.

The method includes receiving the instruction, at block 765. In some embodiments, the instruction may have a register specifier to explicitly specify a base architectural register for a block of a number (N) sequential architectural registers.

At block 766, if the number (N) of sequential architectural registers is two, then one least significant bit of the register specifier may be masked off (e.g., assumed to be zero) to obtain the replacement base architectural register. Alternatively, at block 767, if the number (N) of sequential registers is three or four, then two least significant bits of the register specifier may be masked off to obtain the replacement base register. Or, at block 768, if the number (N) of sequential registers is five to eight, then three least significant bits of the register specifier may be masked off to obtain the replacement base register. Alternatively, at block 769, if the number (N) of sequential registers is nine to sixteen, then four least significant bits of the register specifier may be masked off to obtain the replacement base register.

At block 770, the instruction may be performed for the block of N sequential registers starting at the determined replacement base register. These registers may represent architectural registers. In some embodiments, register renaming may optionally be performed on the replacement architectural registers, instead of the originally/initially indicated architectural registers prior to replacement.

Table 2 includes data for an illustrative working example. This examples assumes that there is an instruction (e.g., INSTRUCTION4 xmm*) that uses a block of four sequential registers, and that specifies a base register for the block xmm*. In four different scenarios considered, the specified base of the block (xmm*) is xmm4, xmm5, xmm6, or xmm7. The different corresponding register specifiers for xmm4-xmm7 are shown. In each case, the number of registers in the block is the same, in this case four. Accordingly, based on Equation 1, the same mask value, mask, and number of least significant bits (LSB) to mask off, are the same, as shown in the table. When the two least significant bits of each of the register specifiers for xmm4-xmm7 are masked off (e.g., assumed to be zero), the same replacement register specifier is obtained. This replacement register specifier identifies the same base register xmm4. With the replacement base register being xmm4, the four register block may fit within registers xmm4-xmm7. Advantageously, the selection of the replacement registers prevents wrap-around in which the block would wrap-around or roll-over to xmm0 in a 32-bit operation mode.

TABLE 2

Example for instruction that uses block of four sequential registers

| Specified Register | Register Specifier | Number Registers | Mask Value | Mask | LSB to Mask Off | Replace Register Specifier | Replace Base Register |
|---|---|---|---|---|---|---|---|
| xmm4 | 00100 | 4 | 3 | 00011 | 2 | 00100 | xmm4 |
| xmm5 | 00101 | 4 | 3 | 00011 | 2 | 00100 | xmm4 |
| xmm6 | 00110 | 4 | 3 | 00011 | 2 | 00100 | xmm4 |
| xmm7 | 00111 | 4 | 3 | 00011 | 2 | 00100 | xmm4 |

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
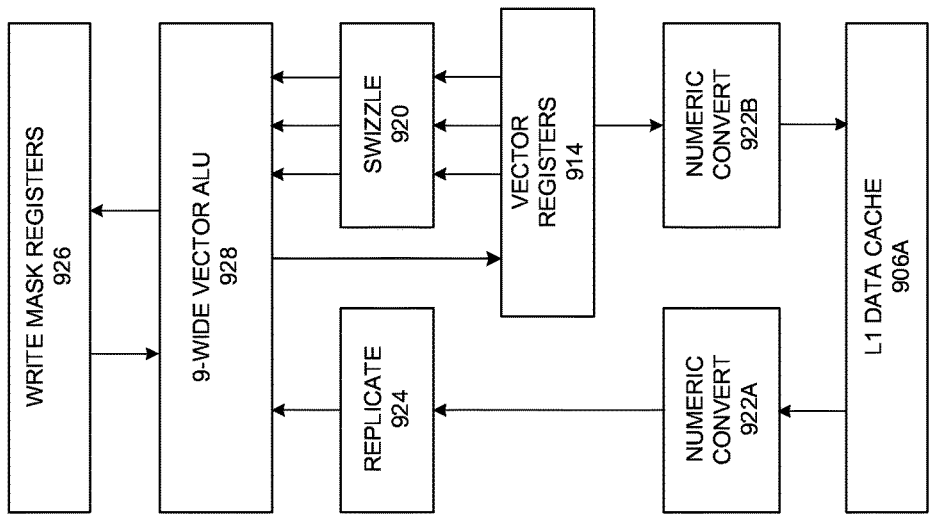
FIG. 9B is a block diagram of an embodiment of an expanded view of part of the processor core of FIG. 9A.
Figure 9A:
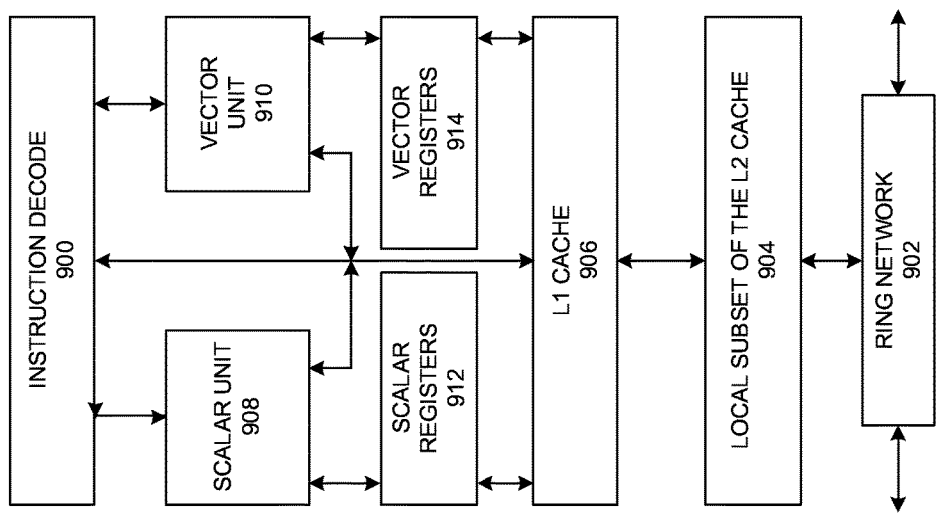
FIG. 9A is a block diagram of an embodiment of a single processor core, along with its connection to the on-die interconnect network, and with its local subset of the Level 2 (L2) cache.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 1912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
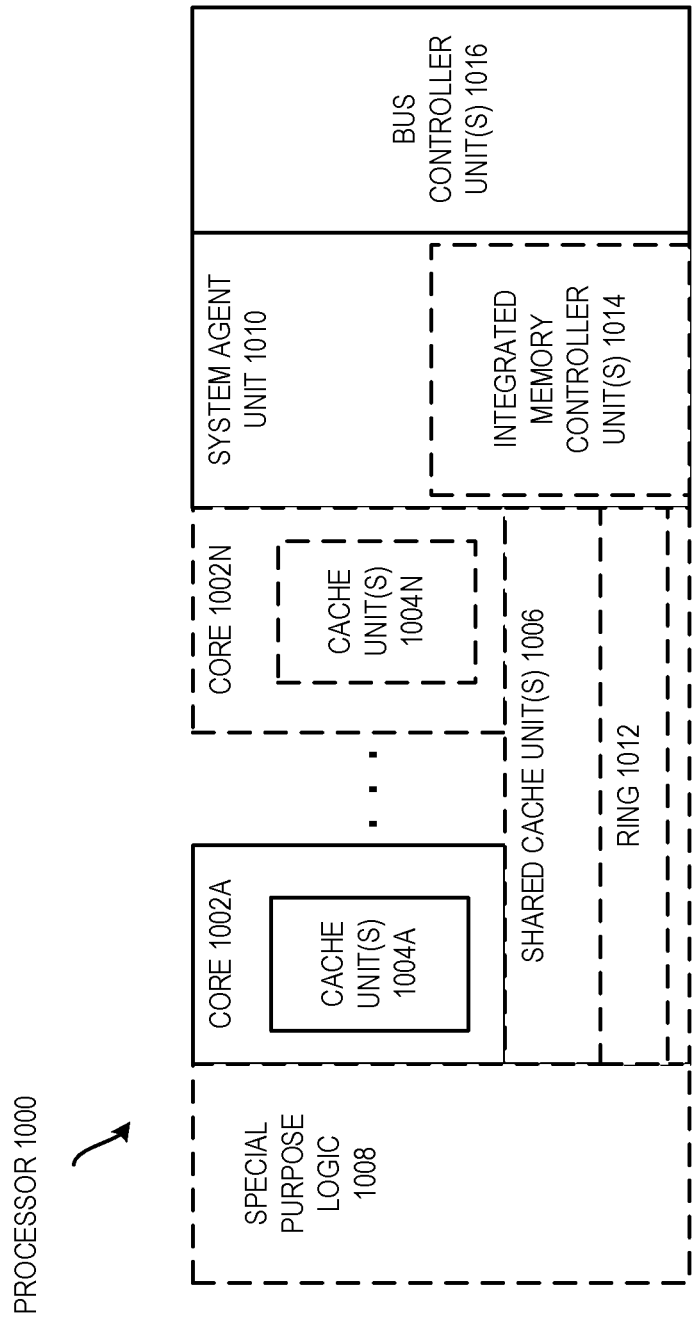
FIG. 10 is a block diagram of an embodiment of a processor that may have more than one core, may have an integrated memory controller, and may have integrated graphics.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
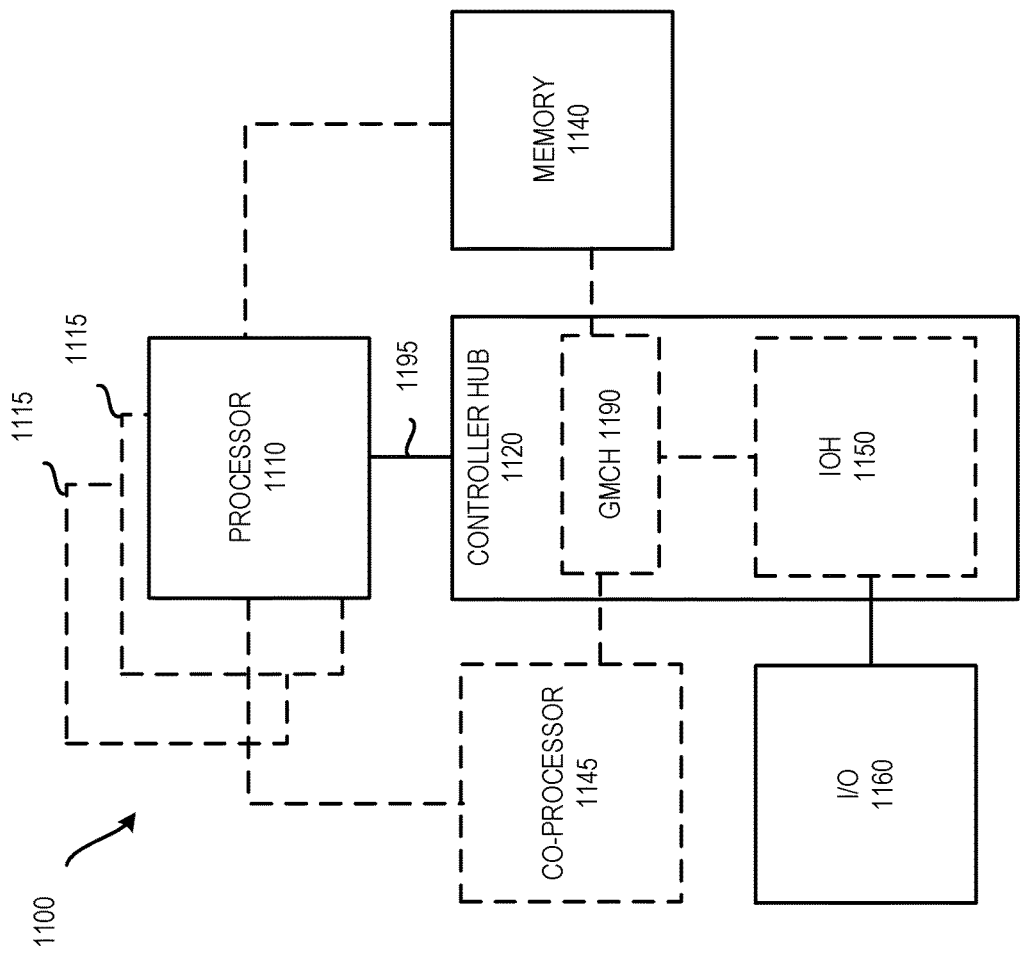
FIG. 11 is a block diagram of a first embodiment of a computer architecture.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
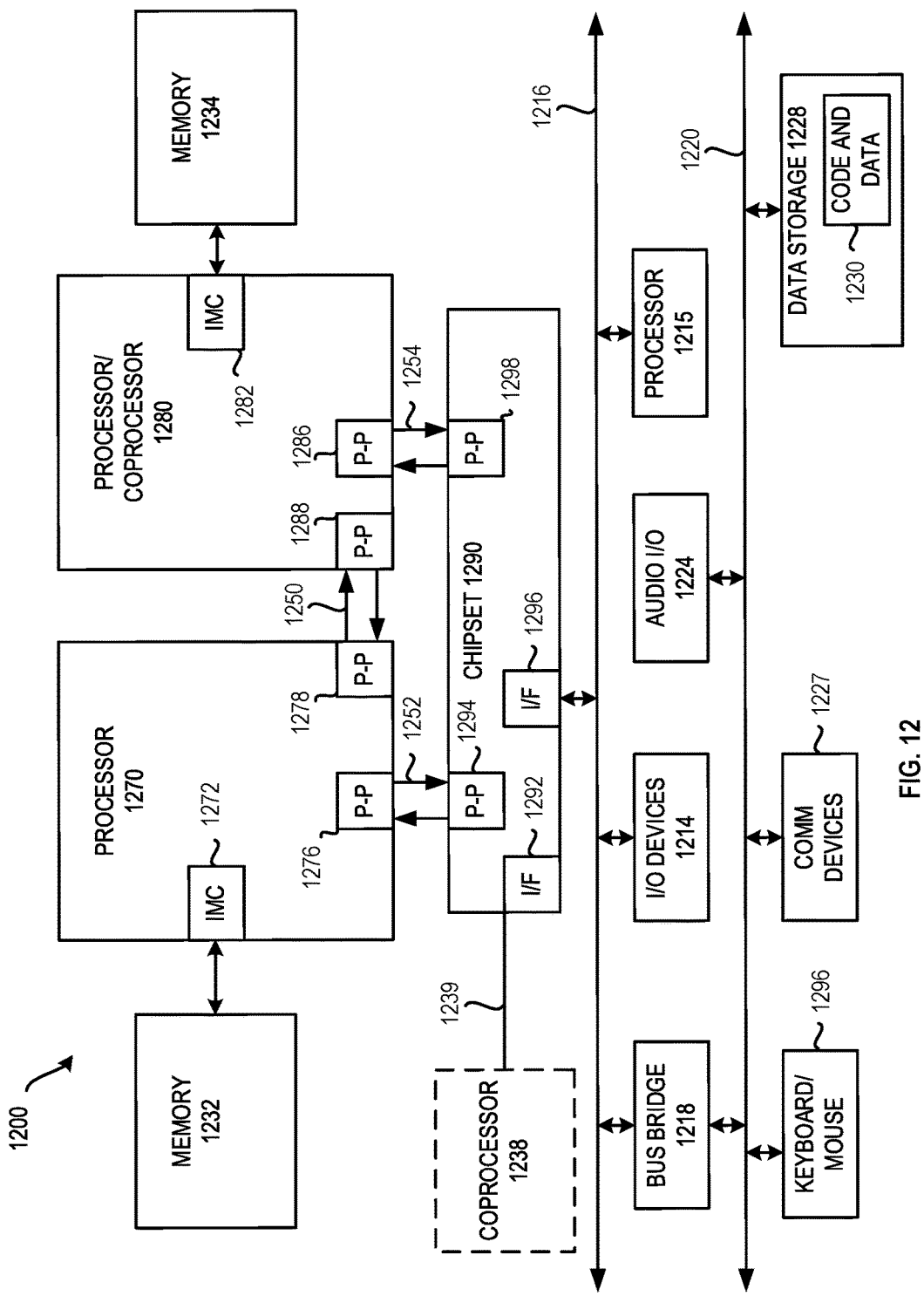
FIG. 12 is a block diagram of a second embodiment of a computer architecture.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
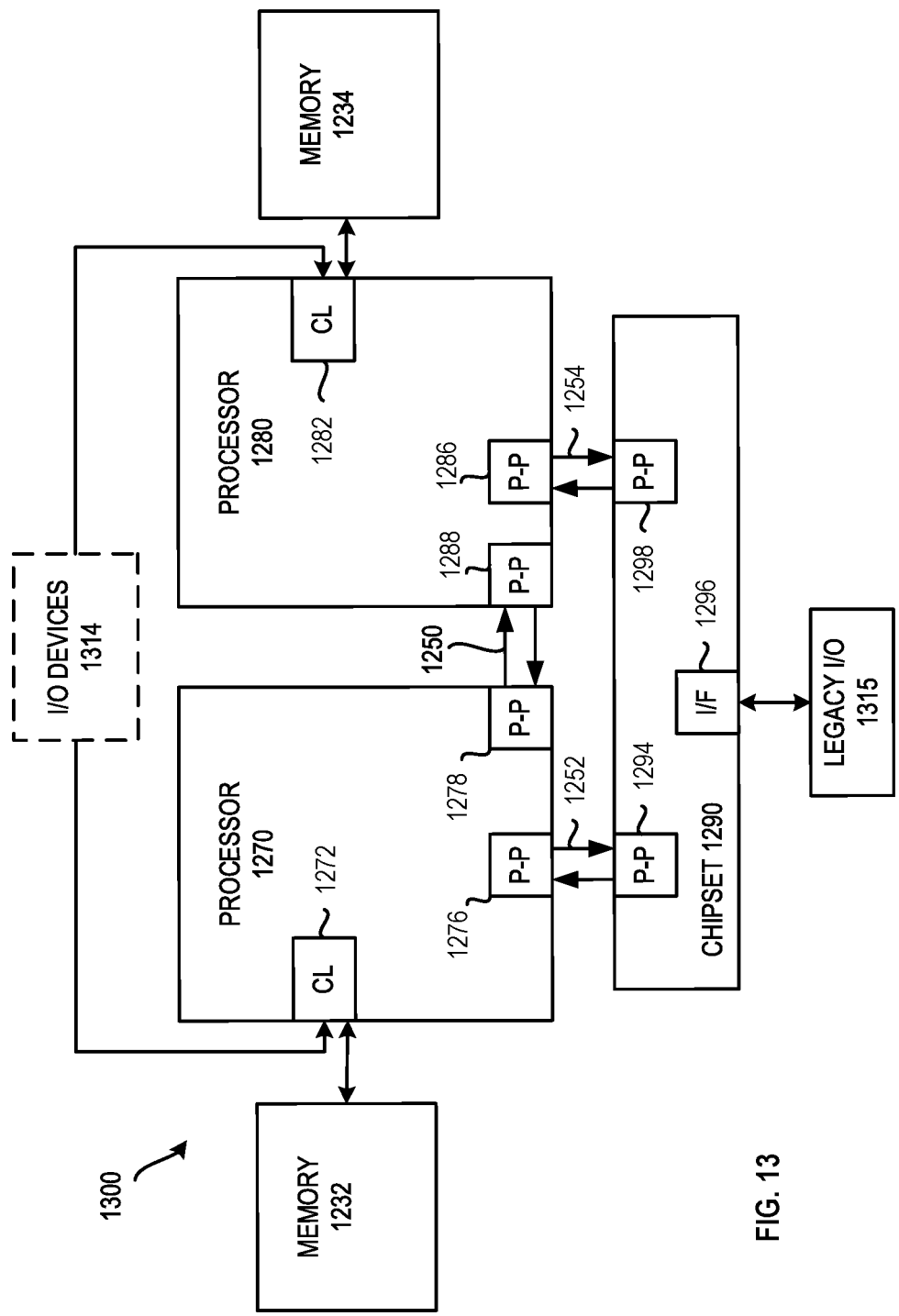
FIG. 13 is a block diagram of a third embodiment of a computer architecture.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
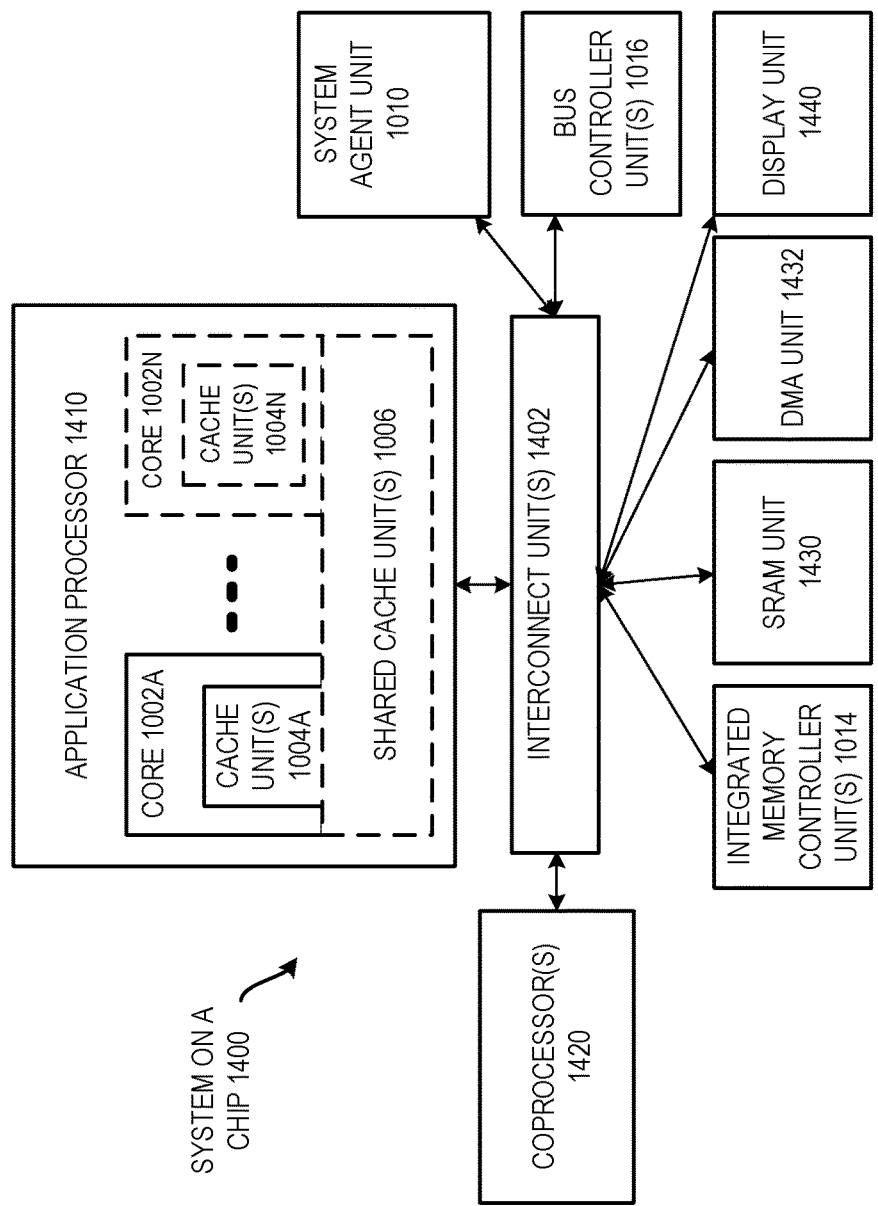
FIG. 14 is a block diagram of a fourth embodiment of a computer architecture.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 132A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
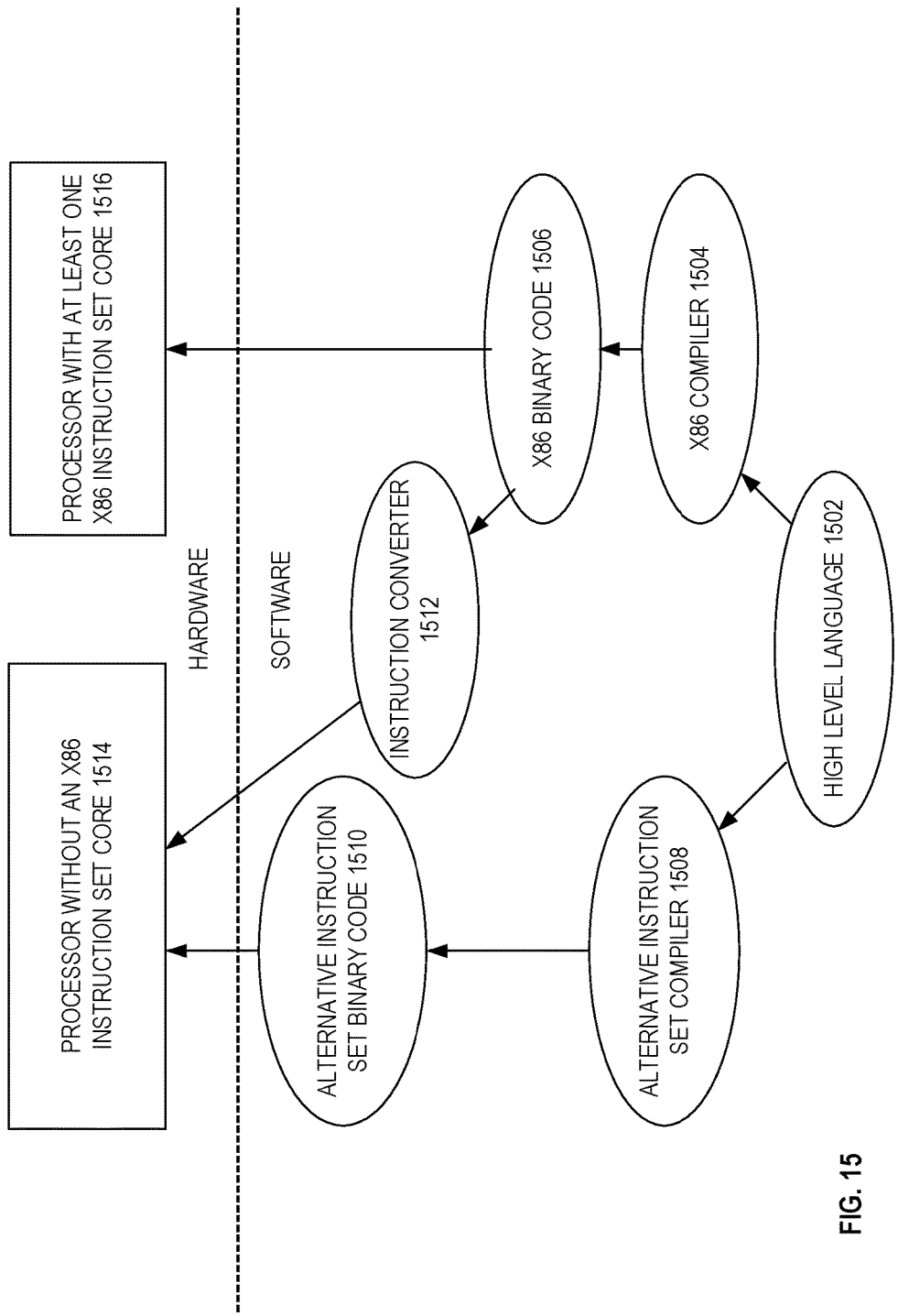
FIG. 15 is a block diagram of use of a software instruction converter to convert binary instructions in a source instruction set to binary instructions in a target instruction set, according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Components, features, and details described for any of the processors disclosed herein may optionally apply to any of the methods disclosed herein, which in embodiments may optionally be performed by and/or with such processors. Any of the processors described herein in embodiments may optionally be included in any of the systems disclosed herein. Any of the instructions disclosed herein in embodiments may optionally be performed by and/or with any of the processors disclosed herein, optionally in some embodiments having any of the microarchitectures shown herein, and optionally in some embodiments included in any of the systems shown herein. Accordingly, features and details described for any of the instructions disclosed herein may in some embodiments therefore optionally apply to any of the processors and/or systems disclosed herein which may be used to perform those instructions.

Processor components disclosed herein may be said to be operative, configured, capable, or able to perform an operation. For example, a decoder may be to decode an instruction, an execution unit may be to store a result, etc. For clarity, it is to be understood that these expressions do not imply that the processor components are in operation or use, but rather refer to what the processor components are capable of doing or able to do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The components disclosed herein and the methods depicted in the preceding figures may be implemented with logic, modules, or units that includes hardware (e.g., transistors, gates, circuitry, etc.), firmware (e.g., a non-volatile memory storing microcode or control signals), software (e.g., stored on a non-transitory computer readable storage medium), or a combination thereof. In some embodiments, the logic, modules, or units may include at least some or predominantly a mixture of hardware and/or firmware potentially combined with some optional software.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode an instruction. The instruction is to explicitly specify a first architectural register and is to implicitly indicate at least a second architectural register. The second architectural register is implicitly to be at a higher register number than the first architectural register. The processor also includes an architectural register replacement unit coupled with the decode unit. The architectural register replacement unit is to replace the first architectural register with a third architectural register, and is to replace the second architectural register with a fourth architectural register. The third architectural register is to be at a lower register number than the first architectural register. The fourth architectural register is to be at a lower register number than the second architectural register.

Example 2 includes the processor of Example 1, in which the decode unit is to decode the instruction in which the second architectural register is implicitly to be at a next sequential higher register number than the first architectural register. The architectural register replacement unit is replace the second architectural register with the fourth architectural register which is to be at a next sequential higher register number than the third architectural register.

Example 3 includes the processor of Example 1, in which decode unit is to decode the instruction that is to explicitly specify the first architectural register that is to be a base architectural register of a block of sequential architectural registers that are to be used to perform the instruction. The architectural register replacement unit is to replace the first architectural register with the third architectural register that is to be at the lower register number that is to be based on a number of the sequential architectural registers of the block.

Example 4 includes the processor of Example 3, in which decode unit is to decode the instruction that is to explicitly specify a register specifier for the first architectural register. The architectural register replacement unit is to replace the first architectural register with the third architectural register which is to have a register specifier that is to include a subset of most significant bits of the register specifier for the first architectural register.

Example 5 includes the processor of Example 4, in which the block is to consist essentially of two sequential architectural registers. The register specifier for the third architectural register is optionally to be equal to the register specifier for the first architectural register with its least significant single bit being binary zero.

Example 6 includes the processor of Example 4, in which the block is to consist essentially of one of three and four sequential architectural registers. The register specifier for the third architectural register is optionally to be equal to the register specifier for the first architectural register with its two least significant bits being binary zero.

Example 7 includes the processor of Example 4, in which the block is to consist essentially of one of five, six, seven, and eight sequential architectural registers. The register specifier for the third architectural register is optionally to be equal to the register specifier for the first architectural register with its three least significant bits being binary zero.

Example 8 includes the processor of any one of Examples 1 to 7, in which the architectural register replacement unit is to replace the first architectural register with the third architectural register, and is to replace the second architectural register with the fourth architectural register, in a way that is able to prevent register wrap-around.

Example 9 includes the processor of any one of Examples 1 to 7, in which the first architectural register is to be one of a set of architectural registers. The processor is to have a first mode of operation and a second mode of operation that are to support different numbers of the set of architectural registers.

Example 10 includes the processor of any one of Examples 1 to 7, further including an execution unit coupled with the decode unit. The execution unit to perform the instruction based on the third and fourth architectural registers.

Example 11 is a processor including a decode unit to decode an instruction. The instruction to have a first register specifier to specify a base architectural register for a block of a number of sequential architectural registers that are to be used to perform the instruction. The processor also includes an architectural register replacement unit coupled with the decode unit. The architectural register replacement unit is to replace the base architectural register for the block with a replacement base architectural register. A second register specifier for the replacement base architectural register is to be equal to one of: (1) the first register specifier with its least significant single bit being binary zero, when the block consists essentially of two sequential architectural registers; (2) the first register specifier with its least significant two bits being binary zero, when the block consists essentially of one of three and four sequential architectural registers; (3) the first register specifier with its least significant three bits being binary zero, when the block consists essentially of one of five, six, seven, and eight sequential architectural registers; and (4) the first register specifier with its least significant four bits being binary zero, when the block consists essentially of one of nine, ten, eleven, twelve, thirteen, fourteen, and fifteen sequential architectural registers.

Example 12 includes the processor of Example 11, in which the architectural register replacement unit is to replace each of the other architectural registers in the block with a corresponding replacement architectural register that is to sequentially follow one another after the replacement base architectural register.

Example 13 is a method performed by a processor. The method includes receiving an instruction. The instruction explicitly specifying a first architectural register and implicitly indicating at least a second architectural register. The second architectural register is implicitly at a higher register number than the first architectural register. The method also includes replacing the first architectural register with a third architectural register at a lower register number than the first architectural register. The method also includes replacing the second architectural register with a fourth architectural register at a lower register number than the second architectural register.

Example 14 includes the method of Example 13, in which the receiving includes receiving the instruction that implicitly indicates the second architectural register that is at a next sequential higher register number than the first architectural register. Also, the second architectural register is replaced with the fourth architectural register that is at a next sequential higher register number than the third architectural register.

Example 15 includes the method of Example 13, in which the receiving includes receiving the instruction that explicitly specifies the first architectural register that is a base architectural register of a block of sequential architectural registers to be used to perform the instruction. Also, replacing the first architectural register includes replacing the first architectural register with the third architectural register at the lower register number that is based on a number of the sequential architectural registers of the block.

Example 16 includes the method of Example 15, in which the receiving includes receiving the instruction that explicitly specifies a register specifier for the first architectural register. Also, replacing the first architectural register includes replacing the first architectural register with the third architectural register that has a register specifier that includes a subset of most significant bits of the register specifier for the first architectural register.

Example 17 includes the method of Example 16, in which the block consists essentially of one of three and four sequential architectural registers. The method also includes determining the register specifier for the third architectural register by clearing a least significant two bits of the register specifier for the first architectural register.

Example 18 includes the method of Example 16, in which the block consists essentially of one of five, six, seven, and eight sequential architectural registers. The method also includes including determining the register specifier for the third architectural register by clearing a least significant three bits of the register specifier for the first architectural register.

Example 19 includes the method of any one of Examples 13 to 18, in which the replacing the first architectural register and the replacing the second architectural register comprise preventing register wrap-around for the instruction.

Example 20 includes the method of any one of Examples 13 to 19, further including performing the instruction in a first operating mode of the processor. In the first operating mode the first architectural register is one of a number of architectural registers supported for the first operating mode, and in which the processor also has a second operating mode which supports a greater number of the architectural registers.

Example 21 is system to process instructions including an interconnect, and a processor coupled with the interconnect. The processor to receive an instruction that is to explicitly specify a first architectural register and to implicitly indicate at least a second architectural register. The second architectural register is implicitly to be at a higher register number than the first architectural register. The processor is to replace the first architectural register with a third architectural register, and to replace the second architectural register with a fourth architectural register. The third architectural register is to be at a lower register number than the first architectural register, and in which the fourth architectural register is to be at a lower register number than the second architectural register. The system also includes a dynamic random access memory (DRAM) coupled with the interconnect.

Example 22 includes the system of Example 21, in which the second architectural register is implicitly to be at a next sequential higher register number than the first architectural register. The processor is to replace the second architectural register with the fourth architectural register which is to be at a next sequential higher register number than the third architectural register.

Example 23 includes the system of any one of Examples 21 to 22, in which the processor is to replace the first architectural register with the third architectural register, and is to replace the second architectural register with the fourth architectural register, in a way that is able to prevent register wrap-around. Example 24 includes the processor of any one of Examples 1 to 10, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 25 includes a system-on-chip that includes at least one interconnect, the processor of any one of Examples 1 to 10 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 26 is a processor or other apparatus operative to perform the method of any one of Examples 13 to 20.

Example 27 is a processor or other apparatus that includes means for performing the method of any one of Examples 13 to 20.

Example 28 is a processor or other apparatus that includes any combination of modules and/or units and/or logic and/or circuitry and/or means operative to perform the method of any one of Examples 13 to 20.

Example 29 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 13 to 20.

Example 30 is a processor or other apparatus substantially as described herein.

Example 31 is a processor or other apparatus that is operative to perform any method substantially as described herein.

Example 32 is a processor or other apparatus that is operative to perform any instruction substantially as described herein.

What is claimed is:

1. A processor comprising:
a decode unit to decode an instruction, the instruction to explicitly specify a first architectural register and to implicitly indicate at least a second architectural register, in which the second architectural register is implicitly for the instruction to be at a higher register number than the first architectural register; and
an architectural register replacement unit coupled with the decode unit, the architectural register replacement unit to replace the first architectural register with a third architectural register, and to replace the second architectural register with a fourth architectural register, in which the third architectural register is to be at a lower register number than the first architectural register, and in which the fourth architectural register is to be at a lower register number than the second architectural register.

2. The processor of claim 1, wherein the decode unit is to decode the instruction in which the second architectural register is implicitly to be at a next sequential higher register number than the first architectural register, and wherein the architectural register replacement unit is replace the second architectural register with the fourth architectural register which is to be at a next sequential higher register number than the third architectural register.

3. A processor comprising:
a decode unit to decode an instruction, the instruction to explicitly specify a first architectural register and to implicitly indicate at least a second architectural register, in which the second architectural register is implicitly to be at a higher register number than the first architectural register, wherein the first architectural register is to be a base architectural register of a block of sequential architectural registers that are to be used to perform the instruction; and
an architectural register replacement unit coupled with the decode unit, the architectural register replacement unit to replace the first architectural register with a third architectural register, and to replace the second architectural register with a fourth architectural register, in which the third architectural register is to be at a lower register number than the first architectural register, and in which the fourth architectural register is to be at a lower register number than the second architectural register, wherein the third architectural register is to be at the lower register number that is to be based on a number of the sequential architectural registers of the block.

4. The processor of claim 3, wherein decode unit is to decode the instruction that is to explicitly specify a register specifier for the first architectural register, and wherein the architectural register replacement unit is to replace the first architectural register with the third architectural register which is to have a register specifier that is to include a subset of most significant bits of the register specifier for the first architectural register.

5. The processor of claim 4, wherein the block is to include only two sequential architectural registers, and wherein the register specifier for the third architectural register is to be equal to the register specifier for the first architectural register with its least significant single bit being binary zero.

6. The processor of claim 4, wherein the block is to include one of only three and only four sequential architectural registers, and wherein the register specifier for the third architectural register is to be equal to the register specifier for the first architectural register with its two least significant bits being binary zero.

7. The processor of claim 4, wherein the block is to include one of only five, only six, only seven, and only eight sequential architectural registers, and wherein the register specifier for the third architectural register is to be equal to the register specifier for the first architectural register with its three least significant bits being binary zero.

8. The processor of claim 1, wherein the architectural register replacement unit is to replace the first architectural register with the third architectural register, and is to replace the second architectural register with the fourth architectural register, in a way that is able to prevent register wraparound.

9. The processor of claim 1, wherein the first architectural register is to be one of a set of architectural registers, and wherein the processor is to have a first mode of operation and a second mode of operation that are to support different numbers of the set of architectural registers.

10. The processor of claim 1, further comprising an execution unit coupled with the decode unit, the execution unit to perform the instruction based on the third and fourth architectural registers.

11. A processor comprising:
a decode unit to decode an instruction, the instruction to have a first register specifier to specify a base architectural register for a block of a number of sequential architectural registers that are to be used to perform the instruction; and
an architectural register replacement unit coupled with the decode unit, the architectural register replacement unit to replace the base architectural register for the block with a replacement base architectural register, wherein a second register specifier for the replacement base architectural register is to be equal to one of:
the first register specifier with its least significant single bit being binary zero, when the block includes only two sequential architectural registers;
the first register specifier with its least significant two bits being binary zero, when the block includes one of only three and only four sequential architectural registers;
the first register specifier with its least significant three bits being binary zero, when the block includes one of only five, only six, only seven, and only eight sequential architectural registers; and
the first register specifier with its least significant four bits being binary zero, when the block includes one of only nine, only ten, only eleven, only twelve, only thirteen, only fourteen, and only fifteen sequential architectural registers.

12. The processor of claim 11, wherein the architectural register replacement unit is to replace each of the other architectural registers in the block with a corresponding replacement architectural register that is to sequentially follow one another after the replacement base architectural register.

13. A method performed by a processor, the method comprising:
receiving an instruction, the instruction explicitly specifying a first architectural register and implicitly indicating at least a second architectural register, in which the second architectural register is implicitly for the instruction at a higher register number than the first architectural register; and
replacing the first architectural register with a third architectural register at a lower register number than the first architectural register; and
replacing the second architectural register with a fourth architectural register at a lower register number than the second architectural register.

14. The method of claim 13, wherein said receiving comprises receiving the instruction that implicitly indicates the second architectural register that is at a next sequential higher register number than the first architectural register, and wherein said replacing the second architectural register comprises replacing the second architectural register with the fourth architectural register that is at a next sequential higher register number than the third architectural register.

15. The method of claim 13, wherein said receiving comprises receiving the instruction that explicitly specifies the first architectural register that is a base architectural register of a block of sequential architectural registers to be used to perform the instruction, and wherein said replacing the first architectural register comprises replacing the first architectural register with the third architectural register at the lower register number that is based on a number of the sequential architectural registers of the block.

16. The method of claim 15, wherein said receiving comprises receiving the instruction that explicitly specifies a register specifier for the first architectural register, and wherein said replacing the first architectural register comprises replacing the first architectural register with the third architectural register that has a register specifier that includes a subset of most significant bits of the register specifier for the first architectural register.

17. The method of claim 16, wherein the block consists essentially of one of three and four sequential architectural registers, and further comprising determining the register specifier for the third architectural register by clearing a least significant two bits of the register specifier for the first architectural register.

18. The method of claim 16, wherein the block consists essentially of one of five, six, seven, and eight sequential architectural registers, and further comprising determining the register specifier for the third architectural register by clearing a least significant three bits of the register specifier for the first architectural register.

19. The method of claim 13, wherein said replacing the first architectural register and said replacing the second architectural register comprise preventing register wrap-around for the instruction.

20. The method of claim 13, further comprising performing the instruction in a first operating mode of the processor, wherein in the first operating mode the first architectural register is one of a number of architectural registers supported for the first operating mode, and wherein the processor also has a second operating mode which supports a greater number of the architectural registers.

21. A system to process instructions comprising:
an interconnect;
a processor coupled with the interconnect, the processor to receive an instruction that is to explicitly specify a first architectural register and to implicitly indicate at least a second architectural register, in which the second architectural register is implicitly for the instruction to be at a higher register number than the first architectural register, the processor to replace the first architectural register with a third architectural register, and to replace the second architectural register with a fourth architectural register, in which the third architectural register is to be at a lower register number than the first architectural register, and in which the fourth architectural register is to be at a lower register number than the second architectural register; and
a dynamic random access memory (DRAM) coupled with the interconnect.

22. The system of claim 21, wherein the second architectural register is implicitly to be at a next sequential higher register number than the first architectural register, and wherein the processor is to replace the second architectural register with the fourth architectural register which is to be at a next sequential higher register number than the third architectural register.

23. The system of claim 21, wherein the processor is to replace the first architectural register with the third architectural register, and is to replace the second architectural register with the fourth architectural register, in a way that is able to prevent register wrap-around.

* * * * *